(12) United States Patent
Chang

(10) Patent No.: US 12,140,815 B2
(45) Date of Patent: Nov. 12, 2024

(54) FIBRE OPTIC PULLING GRIP ASSEMBLY

(71) Applicant: EZCONN CORPORATION, New Taipei (TW)

(72) Inventor: Pao-chen Chang, New Taipei (TW)

(73) Assignee: EZconn Corporation, New Taipei (TW)

( * ) Notice: Subject to any disclaimer, the term of this patent is extended or adjusted under 35 U.S.C. 154(b) by 656 days.

(21) Appl. No.: 17/321,401

(22) Filed: May 15, 2021

(65) Prior Publication Data

US 2021/0364723 A1   Nov. 25, 2021

(30) Foreign Application Priority Data

May 22, 2020   (TW) .................................. 109206334

(51) Int. Cl.
| | | |
|---|---|---|
| *G02B 6/44* | (2006.01) | |
| *G02B 6/54* | (2006.01) | |
| *H02G 1/08* | (2006.01) | |

(52) U.S. Cl.
CPC ............. *G02B 6/545* (2023.05); *H02G 1/081* (2013.01)

(58) Field of Classification Search
CPC ................................ G02B 6/545; H02G 1/081
USPC ....................... 254/134.3 R, 134.3 FT, 86.42
See application file for complete search history.

(56) References Cited

U.S. PATENT DOCUMENTS

| | | | | |
|---|---|---|---|---|
| 4,600,331 A | * | 7/1986 | Gray ....................... | F16G 15/08 59/95 |
| 4,601,507 A | * | 7/1986 | Fallon ..................... | F16L 3/003 24/115 N |
| 5,015,023 A | * | 5/1991 | Hall ....................... | F16G 11/048 294/102.1 |
| 5,094,496 A | * | 3/1992 | King, Sr. ............... | H02G 1/081 294/86.12 |
| 2015/0241639 A1 | * | 8/2015 | Lu ......................... | G02B 6/3849 385/139 |

* cited by examiner

*Primary Examiner* — Mahdi H Nejad

(57) ABSTRACT

A fibre optic pulling grip assembly, comprising a sleeve, connection sleeve, swivel pulling eye unit, fitting, clamp, and a securing unit is provided. The sleeve has a sleeve coupling portion and sleeve body. The connection sleeve has a connection sleeve head and connection sleeve body. The swivel pulling eye unit has a pulling eye swivel portion and pulling eye body. The connection sleeve body is configured for fixed assembly of the pulling eye body therewithin, the sleeve coupling portion is configured for fixed assembly of the connection sleeve body therewithin, and the fitting is configured for fixed assembly of the sleeve coupling portion therewithin. The clamp has a clamp securing portion and clamping portion. The securing unit moves longitudinally toward the clamping portion, such that the fitting is moved to assemble to the sleeve coupling portion, applying pressure to the sleeve coupling portion supported by the connection sleeve body.

11 Claims, 5 Drawing Sheets

FIBRE OPTIC PULLING GRIP ASSEMBLY

RELATED APPLICATIONS

The application claims the benefit of priority to Taiwan application no. 109206334, filed on May 22, 2020, of which is incorporated herein by reference in its entirety.

TECHNICAL FIELD

Example embodiments relate generally to the field of optical communications and, more particularly, to fibre optic cable installation assemblies.

BACKGROUND

Driven by the ever-growing computing demands of users for Internet TV, voice over internet protocol (VoIP), smart home applications, and AI-enabled IoT devices, government support for digitization, and transformation of mobile operators into full-service operators, adoption of fiber to the home (FTTH) infrastructure has continued to increase.

FTTH is an advanced networking system that operates on fiber optic networks, providing high-speed and secure communication and internet connectivity. In an FTTH system, optical fiber is installed from a central point directly to an individual premise, such as a house or business, or multi-story building, such as an apartment complex. One technique used for installing fiber optic cables is to pull the cables through a conduit or innerduct. However, if the fiber optic cables are pulled improperly by applying too much tension or stress on a jacket, or having a very tight bend radius, the fiber optic cables may be damaged (broken or cracked), impacting performance.

For short and straight distances, a knot may be tied at a pulling end of a strength-bearing member of a fiber optic cable, and the fiber optic cable may be pulled by hand for installation, if a manufacturer defined tensile-loading limit is not exceeded. With strength of different technicians varying however, not exceeding a defined tensile-loading limit may be challenging. Also, the knot defines a minimum diameter needed for the fiber optic cable to be pulled through a conduit or innerduct for installation, which is problematic when there is minimal space available. Meanwhile, pulling fiber optic cable by hand may be time-consuming.

For longer and straight or non-straight distances, a wire pulling grip may be employed. Dependent on an outside diameter of a fiber optic cable, a length of a pulling grip may vary to meet defined tensile-loading limits. Thus, a technician will be required to carry more than one wire pulling grip for different fiber optic cables having different diameters, which is troublesome. During operation and over time, external wire pulling grips damage easily. Wires tend to break, bulges form due to stress, and rust may accumulate. When damage occurs, a new pulling grip will be required. Also, during installation, wires may need to be tightened to smooth out a mesh of the wire pulling grip, which requires a technician to use gloves to prevent injury. Meanwhile, processes such as trimming, marking, inserting the fiber optic cable into the external wire pulling grip, jacket/sheath removal, fiber core wrapping, cable core wrapping, and tightening of the fiber optic cable and mesh together, all need to be performed before pulling of the fiber optic cable, which requires technical experience to prevent the fiber optic cable from damage and is time-consuming.

SUMMARY

Fibre optic pulling grip assemblies for installing fibre optic cables are provided.

In an embodiment, a fibre optic pulling grip assembly, configured for installing fibre optic cables, comprising a sleeve, connection sleeve, swivel pulling eye unit, and fitting is provided. The sleeve has a sleeve coupling portion and sleeve body. The sleeve coupling portion is disposed on an end of the sleeve body. The connection sleeve has a connection sleeve head and connection sleeve body. The connection sleeve head is disposed on an end of the connection sleeve body. The swivel pulling eye unit has a pulling eye swivel portion and pulling eye body. The pulling eye swivel portion is disposed on an end of the pulling eye body. The connection sleeve body is configured for fixed assembly of the pulling eye body therewithin, whereby the pulling eye swivel portion protrudes outwardly from the connection sleeve head. The sleeve coupling portion is configured for fixed assembly of the connection sleeve body therewithin, and the fitting is configured for fixed assembly of the sleeve coupling portion therewithin. The fitting applies pressure to the sleeve coupling portion supported by the connection sleeve body.

In some embodiments, the shape of the sleeve coupling portion is tapered from the sleeve body disposed end. In some embodiments, the sleeve coupling portion comprises at least one sleeve split, longitudinal from the sleeve body disposed end.

In some embodiments, the connection sleeve head comprises a shouldered portion configured for supporting an end of the sleeve coupling portion flush therewith, when the connection sleeve body is fixedly assembled within the sleeve coupling portion. In some embodiments, an opening of the connection sleeve head is smaller than an opening of the connection sleeve body.

In some embodiments, an outer surface of the connection sleeve body is configured for fixed assembly to an inner surface of the sleeve coupling portion and an inner surface of the fitting is configured for fixed assembly to an outer surface of the sleeve coupling portion, whereby the shapes of the connection sleeve body, sleeve coupling portion, and fitting correspond together, such that the fitting applies pressure to the sleeve coupling portion supported by the connection sleeve body.

The unobstructed and sleek profile of the fibre optic pulling grip assembly, effectively allow for minimized diameter requirements for pulling of the fibre optic cables through conduits or innerducts; thus, decreasing minimal available space concerns during installation of the fibre optic cables.

In some embodiments, the connection sleeve body comprises a plurality of radial split serrations on an outer surface thereof. In certain embodiments, the connection sleeve body comprises at least one connection sleeve split, the at least one connection sleeve split is disposed longitudinal from the connection sleeve head to an end of the connection sleeve body and separates the plurality of radial split serrations.

In some embodiments, the swivel pulling eye unit further comprises an eye and a swivel. The swivel is detachably mounted to the pulling eye swivel portion and the eye detachably mounted to the swivel. In certain embodiments, the swivel pulling eye unit further comprises a first nut and a second nut. The first and second nuts are detachably mounted to the pulling eye swivel portion, sandwiching and securing the swivel therebetween, and the swivel comprises a swivel track unit configured for detachable mounting and swiveling of the eye thereto and thereof. In certain embodiments, the swivel track unit comprises a swivel track for detachable mounting and swiveling of the eye thereto and thereof. In certain embodiments, the fibre optic pulling grip assembly further comprises a washer, detachably mounted to the pulling eye swivel portion near to the pulling eye body, between the second nut opposite the swivel and an end of the connection sleeve head opposite the connection sleeve body.

The mechanical strength of the swivel pulling eye unit and the fixed assembly thereof within the connection sleeve body, the tapered shape of the sleeve coupling portion and direct contact with the maximum amount of plurality of radial split serrations, and/or plurality of inner radial serrations of the fitting fixedly attached to the sleeve coupling portion, assure an efficient and effective tight assembly of the fibre optic pulling grip assembly.

In some embodiments, the fibre optic pulling grip assembly further comprises a clamp and a securing unit for mechanical assembly of the fitting to the sleeve coupling portion. The clamp has a clamp securing portion and clamping portion. The clamp securing portion is disposed on an end of the clamping portion. The clamp is detachably assembled to the sleeve body, and the securing unit is detachably assembled to the clamp securing portion and longitudinally movable therewith. One end of the securing unit corresponds with and secures the fitting. When an opposite end of the securing unit moves longitudinally toward the clamping portion, the fitting is moved to assemble to the sleeve coupling portion, applying pressure to the sleeve coupling portion supported by the connection sleeve body.

In certain embodiments, the clamp further comprises at least two clamping screw communicating through the clamping portion, configured to assemble and fix the clamp to the sleeve body.

In certain embodiments, the clamp securing portion comprises clamp securing portion threads, whereby the securing unit moves longitudinally toward the clamping portion via rotation around the clamp securing portion threads. In particular embodiments, the securing unit comprises a movable portion having a securing portion disposed on an end thereof, securing the fitting, and a rotatable portion having inner threads. The movable portion is detachably assembled to the rotatable portion. The securing unit moves longitudinally toward the clamping portion via rotation around the clamp securing portion threads via the inner threads.

The fixed assembly of the pulling eye swivel portion through the connection sleeve head, the fixed assembly of the sleeve coupling portion to the connection sleeve body, and fixed assembly of the fitting to the sleeve coupling portion, whereby in an alternative embodiment the clamp and securing unit may be utilized, saves time and decreases reliance on technical expertise for preventing the fibre optic cable from being damaged during the pulling process.

BRIEF DESCRIPTION OF THE DRAWINGS

Unless specified otherwise, the accompanying drawings illustrate aspects of the innovative subject matter described herein. Referring to the drawings, wherein like reference numerals indicate similar parts throughout the several views, several examples of fibre optic pulling grip assembly' incorporating aspects of the presently disclosed principles are illustrated by way of example, and not by way of limitation.

DETAILED DESCRIPTION

Figure 1:
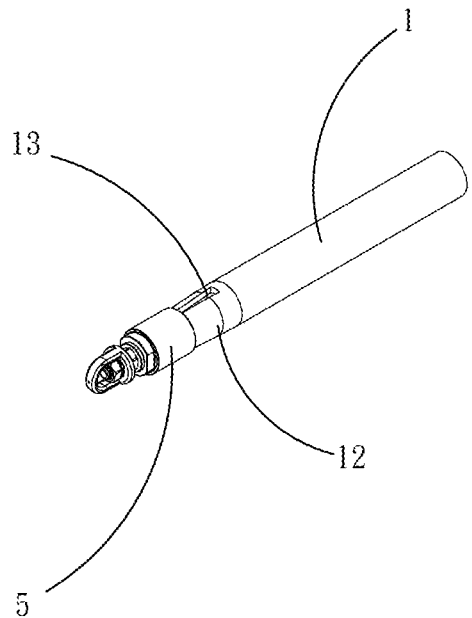
FIG. 1 is a perspective view of a fibre optic pulling grip assembly, according to an example embodiment.

The following describes various principles related to optical communications by way of reference to specific examples of fibre optic cable installation assemblies, including arrangements and examples of fibre optic pulling grip assemblies embodying innovative concepts. More particularly, but not exclusively, such innovative principles are described in relation to selected examples of assembly means, clamping means, mounting means, swiveling means, fastening means, and tubular enclosures and well-known functions or constructions are be described in detail for purposes of succinctness and clarity. Nonetheless, one or more of the disclosed principles can be incorporated in various other embodiments of assembly means, clamping means, mounting means, swiveling means, fastening means, and tubular enclosures to achieve any of a variety of desired outcomes, characteristics, and/or performance criteria.

Thus, assembly means, clamping means, mounting means, swiveling means, fastening means, and tubular enclosures having attributes that are different from those specific examples discussed herein can embody one or more of the innovative principles, and can be used in applications not described herein in detail. Accordingly, embodiments of assembly means, clamping means, mounting means, swiveling means, fastening means, and tubular enclosures not described herein in detail also fall within the scope of this disclosure, as will be appreciated by those having ordinary skill in the relevant art following a review of this disclosure.

Example embodiments as disclosed herein are directed to fibre optic pulling grip assemblies. In an embodiment, a fibre optic pulling grip assembly comprises a sleeve, connection sleeve, swivel pulling eye unit, fitting, clamp, and a securing unit. The sleeve has a sleeve coupling portion and sleeve body. The connection sleeve has a connection sleeve head and connection sleeve body. The swivel pulling eye unit has a pulling eye swivel portion and pulling eye body. The connection sleeve body is configured for fixed assembly of the pulling eye body therewithin, the sleeve coupling portion is configured for fixed assembly of the connection sleeve body therewithin, and the fitting is configured for fixed assembly of the sleeve coupling portion therewithin. The clamp has a clamp securing portion and clamping portion. The securing unit moves longitudinally toward the clamping portion, such that the fitting is moved to assemble to the sleeve coupling portion, applying pressure to the sleeve coupling portion supported by the connection sleeve body.

In some embodiments the fibre optic pulling grip assembly may be applicable to, as an example and not to be limiting, any type of SMF and MFF optical fibre cable provided by any supplier and having different diameter sizes. The optical fibre cable types of the fibre optic pulling grip assembly of the embodiments may be any suitable optical fibre cable type known to those having ordinary skill in the relevant art.

Generally, the fibre optic cable of the embodiments may be used by commercial businesses, governments, data centers, and FTTH and FTTB networks of telecom companies, as an example, and is not limited to any particular type of fibre optic cable.

The attached elements of the fibre optic pulling grip assembly of the embodiments may be separately and/or integrally formed and made of any suitable material known to those having ordinary skill in the relevant art.

Figure 2:
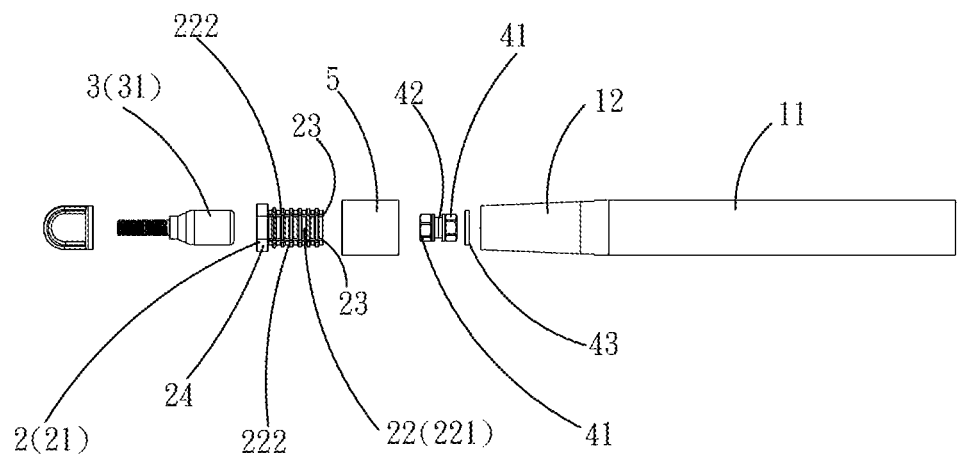
FIG. 2 is a schematic exploded view of the fibre optic pulling grip assembly of FIG. 1, according to an example embodiment.
Figure 3:
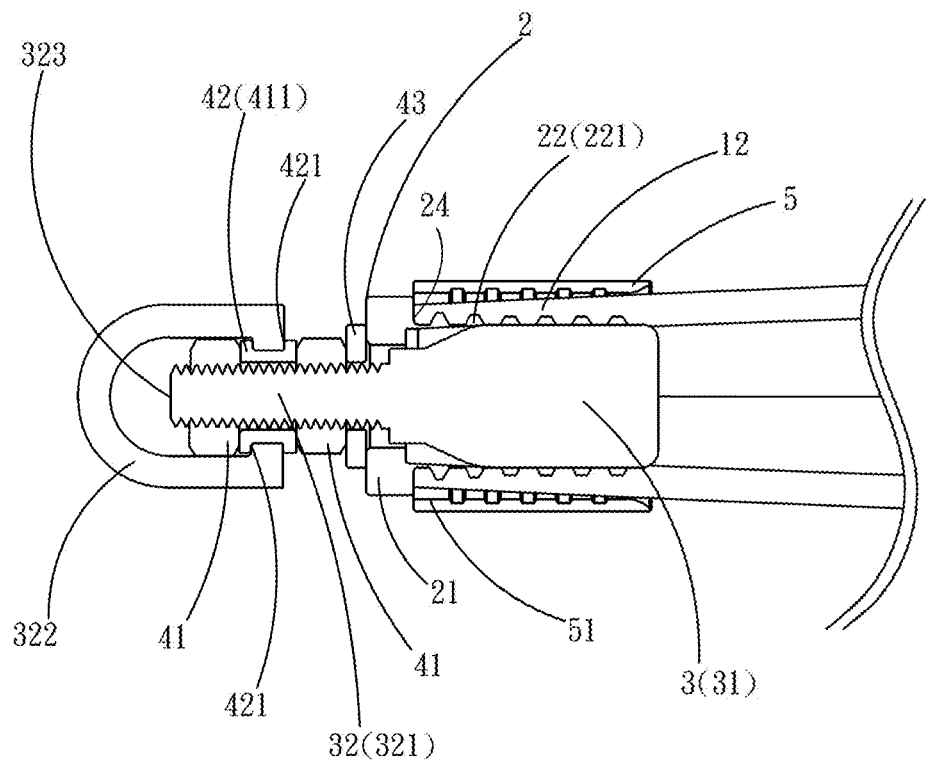
FIG. 3 is a schematic cross-sectional partial view of the fibre optic pulling grip assembly of FIG. 1, according to an example embodiment.

FIG. 1 is a perspective view and FIG. 2 is a schematic exploded view of a fibre optic pulling grip assembly, respectively, according to an example embodiment. FIG. 3 is a schematic cross-sectional partial view of the fibre optic pulling grip assembly of FIG. 1, according to an example embodiment. Referring to FIGS. 1 to 3, in an embodiment, a fibre optic pulling grip assembly, configured for installing fibre optic cables, comprising a sleeve 1, connection sleeve 2, swivel pulling eye unit 3, and fitting 5 is provided. The sleeve 1 has a sleeve coupling portion 12 and sleeve body 11. The sleeve coupling portion 12 is disposed on an end of the sleeve body 11. The connection sleeve 1 has a connection sleeve head 21 and connection sleeve body 22. The connection sleeve head 21 is disposed on an end of the connection sleeve body 22. The swivel pulling eye unit 3 has a pulling eye swivel portion 32 and pulling eye body 31. The pulling eye swivel portion 32 is disposed on an end of the pulling eye body 31. The connection sleeve body 22 is configured for fixed assembly of the pulling eye body 31 therewithin, whereby the pulling eye swivel portion 32 protrudes outwardly from the connection sleeve head 21. The sleeve coupling portion 12 is configured for fixed assembly of the connection sleeve body 22 therewithin, and the fitting 5 is configured for fixed assembly of the sleeve coupling portion 12 therewithin. The fitting 5 applies pressure to the sleeve coupling portion 12 supported by the connection sleeve body 22.

In some embodiments, the shape of the sleeve coupling portion 12 is tapered from the sleeve body 11 disposed end. In some embodiments, the sleeve coupling portion 12 comprises at least one sleeve split 13, longitudinal from the sleeve body 11 disposed end. The tapered shape of the sleeve coupling portion 12 from the sleeve body 11 disposed end is configured to facilitate the fixed assembly of the connection sleeve body 22 within the sleeve coupling portion 12.

In certain embodiments, following fixed assembly of the connection sleeve body 22 within the sleeve coupling portion 12, a waterproofing means, such as a waterproof tape or waterproof strip, as examples, may be mounted to the at least one sleeve split 13, preventing water or moisture from entering the inside of the sleeve 1. Those of ordinary skill in the relevant art may readily appreciate, that other waterproofing means may also be implemented following additional assembly steps, for example, following fixed assembly of the sleeve coupling portion 12 within the fitting 5, whereby a waterproof and/or airtight proof seal is achieved at one and/or both ends of the fitting 5, in addition to the sealed at least one sleeve split 13, and the embodiments are not limited thereto.

The unobstructed and sleek profile of the fibre optic pulling grip assembly, effectively allow for minimized diameter requirements for pulling of the fibre optic cables through conduits or innerducts; thus, decreasing minimal available space concerns during installation of the fibre optic cables.

In some embodiments, the connection sleeve head 21 comprises a shouldered portion 24 configured for supporting an end of the sleeve coupling portion 12 flush therewith, when the connection sleeve body 22 is fixedly assembled within the sleeve coupling portion 12. In some embodiments, an opening of the connection sleeve head 21 is smaller than an opening of the connection sleeve body 22.

In some embodiments, an outer surface of the connection sleeve body 22 is configured for fixed assembly to an inner surface of the sleeve coupling portion 12 and an inner surface of the fitting 5 is configured for fixed assembly to an outer surface of the sleeve coupling portion 12, whereby the shapes of the connection sleeve body 22, sleeve coupling portion 12, and fitting 5 correspond together, such that the fitting 5 applies pressure to the sleeve coupling portion 12 supported by the connection sleeve body 22.

In some embodiments, the connection sleeve body 22 comprises a plurality of radial split serrations 222 on an outer surface thereof. In certain embodiments, the connection sleeve body 22 comprises at least one connection sleeve split 23, the at least one connection sleeve split 23 is disposed longitudinal from the connection sleeve head 21 to an end of the connection sleeve body 22 and separates the plurality of radial split serrations 222.

The plurality of radial split serrations 222 and/or the at least one connection sleeve split 23, is(are) configured to further facilitate the outer surface fixed assembly of the connection sleeve body 22 to the inner surface of the sleeve coupling portion 12, in addition to the tapered shape of the sleeve coupling portion 12. In certain embodiments, the elastic material property of the connection sleeve body 22 is flexible enough to contract and expand when being fixedly assembled to the sleeve coupling portion 12, such that a maximum amount of plurality of radial split serrations 222 are in direct contact with the sleeve coupling portion 12 for efficient and effectively tight assembly.

Those of ordinary skill in the relevant art may readily appreciate, that other designs may be implemented for fixed assembly of the connection sleeve body 22 to the sleeve coupling portion 12, and the embodiments are not limited. As long as the outer surface of the connection sleeve body 22 may be fixedly assembled to the inner surface of the sleeve coupling portion 12 for efficient and effectively tight assembly.

In some embodiments, the fitting 5 comprises a plurality of inner radial serrations on an inner surface thereof. The plurality of inner radial serrations is configured to further facilitate the inner surface fixed assembly of the fitting 5 to the outer surface of the sleeve coupling portion 12.

In some embodiments, the swivel pulling eye unit 3 further comprises an eye 322 and a swivel 42. In some embodiments, the pulling eye swivel portion 32 comprises outer threading. The swivel 42 is detachably mounted to the pulling eye swivel portion 32 and the eye 322 is detachably mounted to the swivel 42. In certain embodiments, the swivel pulling eye unit 3 further comprises a first nut 41 and a second nut 41. The first and second nuts 41, 41 are detachably mounted to the pulling eye swivel portion 32, sandwiching and securing the swivel 42 therebetween, and the swivel 42 comprises a swivel track unit 411 configured for detachable mounting and swiveling of the eye 322 thereto and thereof. In certain embodiments, the swivel track unit 411 comprises a swivel track 421 for detachable mounting and swiveling of the eye 322 thereto and thereof. In certain embodiments, the fibre optic pulling grip assembly further comprises a washer 43, detachably mounted to the pulling eye swivel portion 32 near to the pulling eye body 31, between the second nut 41 opposite the swivel 42 and an end of the connection sleeve head 21 opposite the connection sleeve body 22. The washer 43 is configured to keep the second nut 41 from loosening and/or to distribute the load therefrom and/or for padding or spacing.

Those of ordinary skill in the relevant art may readily appreciate, that integrally formed designs may also be implemented for detachable mounting and swiveling of the eye 322, and the embodiments are not limited. As long as the pulling eye body 31 may be fixedly assembled within the connection sleeve body 22, whereby the pulling eye swivel portion 32 protrudes outwardly from the connection sleeve head 21.

The mechanical strength of the swivel pulling eye unit 3 and the fixed assembly thereof within the connection sleeve body 22, the tapered shape of the sleeve coupling portion 12 and direct contact with the maximum amount of plurality of radial split serrations 222, and/or plurality of inner radial serrations of the fitting 5 fixedly attached to the sleeve coupling portion 12, assure an efficient and effective tight assembly of the fibre optic pulling grip assembly.

In some embodiments, a method for assembly of the fibre optic pulling grip assembly may be as follows. First, the swivel pulling eye unit 3 having the pulling eye swivel portion 32 and pulling eye body 31, is fixedly assembled through the connection sleeve body 22 having the connection sleeve head 21, whereby the pulling eye swivel portion 32 protrudes outwardly from the connection sleeve head 21. Next, the sleeve coupling portion 12 is fixedly assembled to the outer surface of the connection sleeve body 22, whereby an end of the sleeve coupling portion 12 is flush with the shouldered portion 24 of the connection sleeve head 21. Following, the washer 43, second nut 41, swivel 42, and first nut 41 may be fixedly assembled to the pulling eye swivel portion 32. Next, the fitting 5 may be fixedly assembled to the sleeve coupling portion 12, whereby the fitting 5, applies pressure to the sleeve coupling portion 12 supported by the connection sleeve body 22. Following the eye 322 is detachably mounted to the swivel 42.

Figure 4:
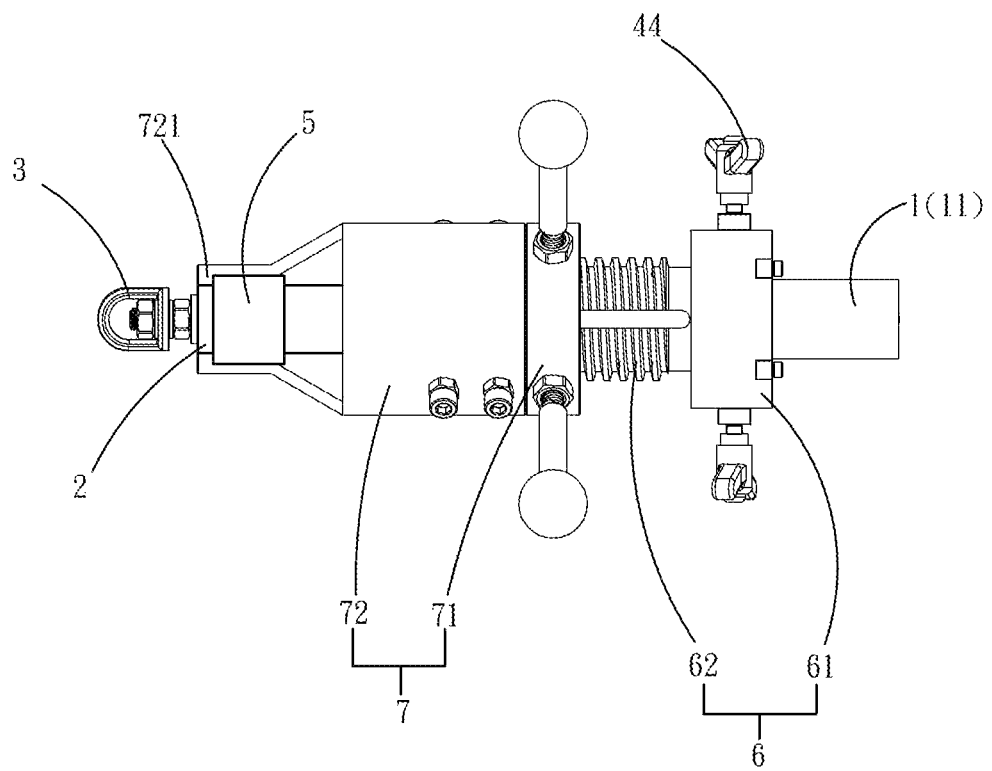
FIG. 4 is a perspective view of a fibre optic pulling grip assembly showing a partial cross-section of a securing unit, according to an example embodiment.
Figure 5:
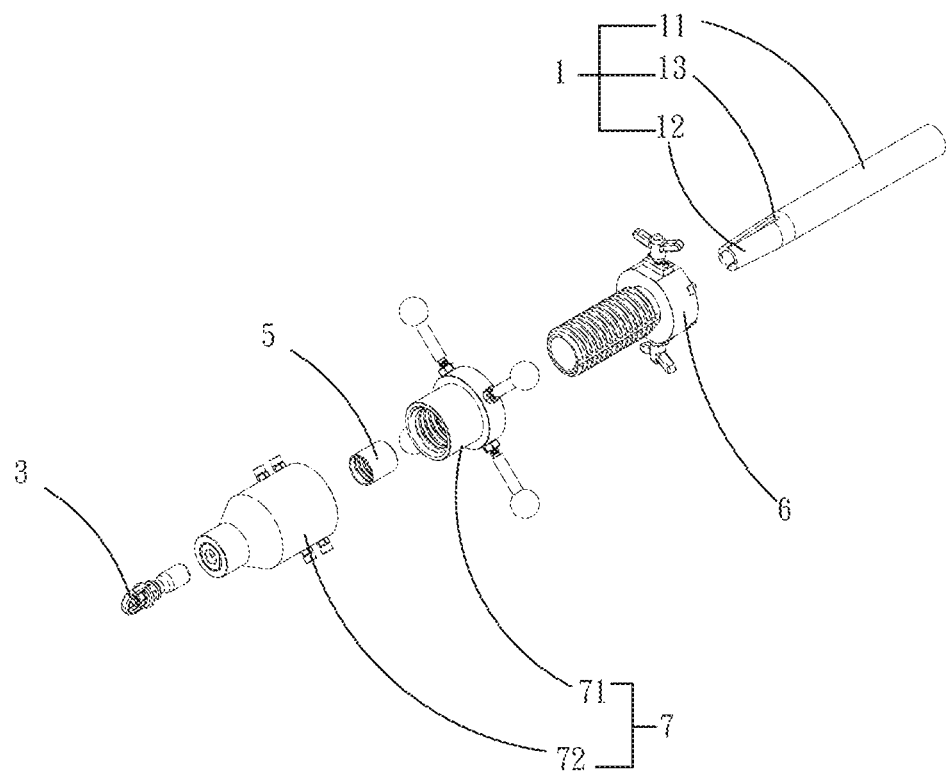
FIG. 5 is a schematic exploded view of the fibre optic pulling grip assembly of FIG. 4, according to an example embodiment.

Those of ordinary skill in the relevant art may readily appreciate that the method for assembly of the fibre optic pulling grip assembly may be implemented without tools; however, the embodiments are not limited thereto. In certain embodiments, the fibre optic pulling grip assembly further comprises a clamp 6 and a securing unit 7, for assembly of the fibre optic pulling grip assembly. FIG. 4 is a perspective view of a fibre optic pulling grip assembly showing a partial cross-section of a securing unit, according to an example embodiment. FIG. 5 is a schematic exploded view of the fibre optic pulling grip assembly of FIG. 4, according to an example embodiment. Referring to FIGS. 5 and 6, and referring to FIGS. 1 to 4, the clamp 6 has a clamp securing portion 62 and clamping portion 61. The clamp securing portion 62 is disposed on an end of the clamping portion 61. The clamp 6 is detachably assembled to the sleeve body 11, and the securing unit 7 is detachably assembled to the clamp securing portion 62 and longitudinally movable therewith. One end of the securing unit 7 corresponds with and secures the fitting 5. When an opposite end of the securing unit 7 moves longitudinally toward the clamping portion 61, the fitting 5 is moved to assemble to the sleeve coupling portion 12, applying pressure to the sleeve coupling portion 12 supported by the connection sleeve body 22.

In certain embodiments, the clamp 6 further comprises at least one clamping screw 44 communicating through the clamping portion 61, configured to assemble and fix the clamp 6 to the sleeve body 11.

In certain embodiments, the clamp securing portion 62 comprises clamp securing portion threads, whereby the securing unit 7 moves longitudinally toward the clamping portion 61 via rotation around the clamp securing portion threads. In particular embodiments, the securing unit 7 comprises a movable portion 72 having a securing portion 721 disposed on an end thereof, securing the fitting 5, and a rotatable portion 71 having inner threads. The movable portion 72 is detachably assembled to the rotatable portion 71. The securing unit 7 moves longitudinally toward the clamping portion 61 via rotation around the clamp securing portion threads via the inner threads.

In certain embodiments, an alternative method for assembly of the fibre optic pulling grip assembly may be as follows. First, the swivel pulling eye unit 3 having the pulling eye swivel portion 32 and pulling eye body 31, is fixedly assembled through the connection sleeve body 22 having the connection sleeve head 21, whereby the pulling eye swivel portion 32 protrudes outwardly from the connection sleeve head 21. Next, the sleeve coupling portion 12 is fixedly assembled to the outer surface of the connection sleeve body 22, whereby an end of the sleeve coupling portion 12 is flush with the shouldered portion 24 of the connection sleeve head 21. Following, the washer 43, second nut 41, swivel 42, and first nut 41 is fixedly assembled to the pulling eye swivel portion 32. Next, the clamp 6 having the clamp securing portion 62 and clamping portion 61, is mounted to the sleeve body 11 via at least two clamping screws 44, 44 communicating through the clamping portion 61. Following, the fitting 5 is secured in the movable portion 72 of the securing portion 721, securing the fitting 5 therein. Next the movable portion 72 is mounted to the rotatable portion 71 of the securing portion 721 having inner threads. Following, the securing portion 721 securing the fitting 5 therein is rotatably mounted to the clamp securing portion 62. Following, the fitting 5 is fixedly assembled to the sleeve coupling portion 12 via longitudinal rotational movement of the securing portion 721 toward the clamping portion 61 mounted to the sleeve body 11, moving the secured fitting 5 to assemble to the sleeve coupling portion 12, applying pressure to the sleeve coupling portion 12 supported by the connection sleeve body 22 for efficient and effectively tight assembly. Following, the eye 322 is detachably mounted to the swivel 42.

In the embodiments, the method for attaching the fibre optic cables to the fibre optic pulling grip assembly saves time and decreases reliance on technical expertise. The pulling eye swivel portion 32 is fixedly assembled through the connection sleeve head 21, the sleeve coupling portion 12 is fixedly assembled to the connection sleeve body 22, and the fitting 5 is fixedly assembled to the sleeve coupling portion 12, whereby in an alternative embodiment, the clamp 6 and securing unit 7 may be utilized, assuring that the fibre optic cable will not be damaged during the pulling process.

In the embodiments, the fibre optic pulling grip assembly is configured for installing fibre optic cables. The fibre optic cables may be of one type having one diameter size. However, the embodiments are not limited thereto. In alternative embodiments, the fibre optic cables may be of more than one fibre optic cable, more than one type, and/or more than one diameter size, and the embodiments are not limited thereto.

FTTH is an advanced networking system that operates on fiber optic networks, providing high-speed and secure communication and internet connectivity. In an FTTH system, optical fiber is installed from a central point directly to an individual premise, such as a house or business, or multi-story building, such as an apartment complex. One technique used for installing fiber optic cables is to pull the cables through a conduit or innerduct. However, if the fiber optic cables are pulled improperly by applying too much tension or stress on a jacket, or having a very tight bend radius, the fiber optic cables may be damaged (broken or cracked), impacting performance.

In the embodiments, fibre optic pulling grip assembly, comprising a sleeve 1, connection sleeve 2, swivel pulling eye unit 3, fitting 5, clamp, and a securing unit is provided. The sleeve 1 has a sleeve coupling portion 12 and sleeve body 11. The connection sleeve 1 has a connection sleeve head 21 and connection sleeve body 22. The swivel pulling eye unit 3 has a pulling eye swivel portion 32 and pulling eye body 31. The connection sleeve body 22 is configured for fixed assembly of the pulling eye body 31 therewithin, the sleeve coupling portion 12 is configured for fixed assembly of the connection sleeve body 22 therewithin, and the fitting 5 is configured for fixed assembly of the sleeve coupling portion 12 therewithin. The clamp 6 has a clamp securing portion 62 and clamping portion 61. The securing unit moves longitudinally toward the clamping portion, such that the fitting 5 is moved to assemble to the sleeve coupling portion 12, applying pressure to the sleeve coupling portion 12 supported by the connection sleeve body 22.

The embodiments of the fibre optic pulling grip assembly allow for technicians to not have to carry more than one wire pulling grip for different fiber optic cables having different diameters via the tapered shape of the sleeve coupling portion 12, elastic material property of the connection sleeve body 22, being flexible enough to contract and expand, and fixed assembly of the fitting 5 to the sleeve coupling portion 12. Thus, more than one fibre optic cable, more than one type of fibre optic cable, and/or more than one diameter size of fibre optic cables may be fixedly assembled to the fibre optic pulling grip assembly, for pulling of fibre optic cables through conduits or innerducts for installation thereof.

The embodiments of the fibre optic pulling grip assembly allow for technicians to not have to carry wire pulling grips or the like for pulling of fibre optic cables through conduits or innerducts for installation thereof. Thus, damage concerns due to broken wires, bulges due to stress, and rust are alleviated. Additionally, technicians will not have to be concerned about injury and carrying extra tools like gloves to tighten wires and smooth out wire meshes.

The embodiments of the fibre optic pulling grip assembly, may efficiently and effectively mitigate moisture and dust from entering into the enclosure, and damage of the fiber optic cables assembled to the fiber optic pulling grip assembly when being pulled during installation via the enclosure of the fibre optic cables within the sleeve 1, connection sleeve 2, swivel pulling eye unit 3, and fitting 5. Also, saving time for waterproofing and/or dust- or dirt-proofing, which would be required for non- or partial-enclosure assemblies.

The unobstructed and sleek profile of the embodiments of the fibre optic pulling grip assembly, effectively allow for minimized diameter requirements for pulling of the fibre optic cables through conduits or innerducts; thus, decreasing minimal available space concerns during installation of the fibre optic cables.

The embodiments of the fibre optic pulling grip assembly, assure that the fiber optic cables are pulled properly by tension or jacket stress control, mitigating damaged (broken or cracked) fiber optic cables which impact performance via the mechanical strength of the swivel pulling eye unit 3 and the fixed assembly thereof within the connection sleeve body 22, the tapered shape of the sleeve coupling portion 12 and direct contact with the maximum amount of plurality of radial split serrations 222, and/or plurality of inner radial serrations of the fitting 5 fixedly attached to the sleeve coupling portion 12, for efficient and effectively tight assembly.

The embodiments of the fibre optic pulling grip assembly simplify the method for attaching the fibre optic cables to the fibre optic pulling grip assembly via the fixed assembly of the pulling eye swivel portion 32 through the connection sleeve head 21, the fixed assembly of the sleeve coupling portion 12 to the connection sleeve body 22, and fixed assembly of the fitting 5 to the sleeve coupling portion 12, saving time and decreasing reliance on technical expertise for preventing the fibre optic cable from being damaged during the pulling process.

The embodiments of the fibre optic pulling grip assembly simplify the mechanical method for attaching the fibre optic cables to the fibre optic pulling grip assembly via the fixed assembly of the pulling eye swivel portion 32 through the connection sleeve head 21, the fixed assembly of the sleeve coupling portion 12 to the connection sleeve body 22, and fixed assembly of the fitting 5 to the sleeve coupling portion 12 using the clamp 6 and securing unit 7, saving time and decreasing reliance on technical expertise for preventing the fibre optic cable from being damaged during the pulling process.

The presently disclosed inventive concepts are not intended to be limited to the embodiments shown herein, but are to be accorded their full scope consistent with the principles underlying the disclosed concepts herein. Directions and references to an element, such as "up," "down,", "upper," "lower," "horizontal," "vertical," "left," "right," and the like, do not imply absolute relationships, positions, and/or orientations. Terms of an element, such as "first" and "second" are not literal, but, distinguishing terms. As used herein, terms "comprises" or "comprising" encompass the notions of "including" and "having" and specify the presence of elements, operations, and/or groups or combinations thereof and do not imply preclusion of the presence or addition of one or more other elements, operations and/or groups or combinations thereof. Sequence of operations do not imply absoluteness unless specifically so stated. Reference to an element in the singular, such as by use of the article "a" or "an", is not intended to mean "one and only one" unless specifically so stated, but rather "one or more". As used herein, "and/or" means "and" or "or", as well as "and" and "or." As used herein, ranges and subranges mean all ranges including whole and/or fractional values therein and language which defines or modifies ranges and subranges, such as "at least," "greater than," "less than," "no more than," and the like, mean subranges and/or an upper or lower limit. All structural and functional equivalents to the elements of the various embodiments described throughout the disclosure that are known or later come to be known to those having ordinary skill in the relevant art are intended to be encompassed by the features described and claimed herein. Moreover, nothing disclosed herein is intended to be dedicated to the public regardless of whether such disclosure may ultimately explicitly be recited in the claims. No element or concept disclosed herein or hereafter presented shall be construed under the provisions of 35 USC 112(f) unless the element or concept is expressly recited using the phrase "means for" or "step for".

In view of the many possible embodiments to which the disclosed principles can be applied, we reserve the right to claim any and all combinations of features and acts described herein, including the right to claim all that comes within the scope and spirit of the foregoing description, as well as the combinations recited, literally and equivalently, in the following claims and any claims presented anytime throughout prosecution of this application or any application claiming benefit of or priority from this application.

What is claimed is:

1. A fibre optic pulling grip assembly, comprising:
a sleeve having a sleeve coupling portion and a sleeve body, the sleeve coupling portion disposed on an end of the sleeve body, the sleeve coupling portion including at least one sleeve split, longitudinal from an end disposed on the end of the sleeve body;
a connection sleeve having a connection sleeve head and a connection sleeve body, the connection sleeve head disposed on an end of the connection sleeve body;
a swivel pulling eye unit having a pulling eye swivel portion and a pulling eye body, the pulling eye swivel portion disposed on an end of the pulling eye body; and
a fitting,
wherein the connection sleeve body is configured for fixed assembly of the pulling eye body therewithin, whereby the pulling eye swivel portion protrudes outwardly from the connection sleeve head, the sleeve coupling portion is configured for fixed assembly of the connection sleeve body therewithin, and the fitting is configured for fixed assembly of the sleeve coupling portion therewithin, whereby the fitting applies pressure to the sleeve coupling portion supported by the connection sleeve body.

2. The fibre optic pulling grip assembly of claim 1, wherein a shape of the sleeve coupling portion is tapered from the sleeve body disposed end.

3. The fibre optic pulling grip assembly of claim 1, wherein an opening of the connection sleeve head is smaller than an opening of the connection sleeve body.

4. The fibre optic pulling grip assembly of claim 1, wherein the connection sleeve head comprises a shouldered portion configured for supporting an end of the sleeve coupling portion flush therewith, when the connection sleeve body is fixedly assembled within the sleeve coupling portion.

5. The fibre optic pulling grip assembly of claim 1, wherein an outer surface of the connection sleeve body is configured for fixed assembly to an inner surface of the sleeve coupling portion and an inner surface of the fitting is configured for fixed assembly to an outer surface of the sleeve coupling portion, whereby shapes of the connection sleeve body, sleeve coupling portion, and fitting correspond together, such that the fitting applies pressure to the sleeve coupling portion supported by the connection sleeve body.

6. The fibre optic pulling grip assembly of claim 1, wherein the connection sleeve body comprises a plurality of radial split serrations on an outer surface thereof.

7. The fibre optic pulling grip assembly of claim 6, wherein the connection sleeve body comprises at least one connection sleeve split, the at least one connection sleeve split is disposed longitudinal from the connection sleeve head to an end of the connection sleeve body and separates the plurality of radial split serrations.

8. The fibre optic pulling grip assembly of claim 1, wherein the swivel pulling eye unit further comprises an eye and a swivel, the swivel detachably mounted to the pulling eye swivel portion, the eye detachably mounted to the swivel.

9. The fibre optic pulling grip assembly of claim 8, wherein the swivel pulling eye unit further comprises a first nut and a second nut, the first and second nuts detachably mounted to the pulling eye swivel portion, sandwiching and securing the swivel therebetween, and the swivel comprises a swivel track unit configured for detachable mounting and swiveling of the eye thereto and thereof.

10. The fibre optic pulling grip assembly of claim 9, wherein the swivel track unit comprises a swivel track for detachable mounting and swiveling of the eye thereto and thereof.

11. The fibre optic pulling grip assembly of claim 9, further comprising a washer detachably mounted to the pulling eye swivel portion near to the pulling eye body, between the second nut opposite the swivel and an end of the connection sleeve head opposite the connection sleeve body.

* * * * *